United States Patent [19]

Foster et al.

[11] Patent Number: 5,073,181

[45] Date of Patent: Dec. 17, 1991

[54] METHOD OF PROTECTING GLASS SURFACES USING SUBMICRON REFRACTORY PARTICLES

[75] Inventors: Gordon F. Foster, Campbell; Noshir B. Havewala, Corning; Robert D. Shoup, Hammondsport, all of N.Y.

[73] Assignee: Corning Incorporated, Corning, N.Y.

[21] Appl. No.: 564,748

[22] Filed: Aug. 9, 1990

[51] Int. Cl.⁵ .......................................... C03B 40/033
[52] U.S. Cl. ........................................ 65/24; 427/27; 427/154
[58] Field of Search ................ 427/154, 27; 65/24, 65/169

[56] References Cited

U.S. PATENT DOCUMENTS 2,725,320  11/1955  Atkeson et al. .................. 65/24 X
3,208,839   9/1965  Nordberg ........................... 65/24

Primary Examiner—Evan Lawrence
Attorney, Agent, or Firm—Milton M. Peterson; Clinton S. Janes, Jr.

[57] ABSTRACT

A method of protecting a glass surface from damage, particularly where a stack of glass sheets is thermally processed at elevated temperatures. The method involves applying a coating of an inert, refractory material in the form of submicron particles to at least one of two opposed glass surfaces.

20 Claims, 1 Drawing Sheet

METHOD OF PROTECTING GLASS SURFACES USING SUBMICRON REFRACTORY PARTICLES

FIELD OF THE INVENTION

The field is heat treating glass bodies, especially protection of a glass surface during such heat treatment.

BACKGROUND OF THE INVENTION

It is common practice in the glass art to stack glass bodies, particularly flat sheet glass, for packaging, shipping and/or storage. It is also well known to protect glass articles, such as glass sheets, from surface damage by applying an interleaving material between the otherwise contacting glass surfaces. Such diverse materials as wood flour, treated papers, organic polymer particles and various salts have been suggested to avoid either surface marring, staining, or both.

These protective measures have been designed for use in ambient temperature applications. While satisfactory under such conditions, they are generally ineffective for elevated temperature applications. Thus, many materials, particularly those of organic nature, are unstable at elevated temperatures. Previously proposed inorganic materials tend to mar a glass surface at temperatures required for certain thermal processing operations.

Recently, a particular need has arisen in connection with thermally processing thin glass sheets to achieve compaction of the glass. Compaction involves reheating a glass body to a temperature below the glass softening point, but above the maximum temperature reached in a subsequent processing step. This achieves structural rearrangement and dimensional relaxation in the glass prior to, rather than during, the subsequent processing. Preliminary compaction is imperative where it is necessary to maintain precise alignment and/or flatness in a glass body during subsequent processing, as in the manufacture of flat panel display devices.

It is economically attractive to compact glass sheets in stacks. However, this necessitates interleaving, or separating, adjacent sheets to avoid sticking. At the same time, it is necessary to maintain the sheets extremely flat, and with an optical-quality surface finish.

PURPOSES OF THE INVENTION

A basic purpose is to provide a means of separating and protecting glass surfaces during processing at elevated temperatures.

Another purpose is to provide such means while maintaining optical-quality surface finish and flatness in the glass surface.

A further purpose is to provide an improved method of heat treating glass bodies in a stacked arrangement.

A still further purpose is to provide a means of isolating adjacent surfaces of glass bodies during thermal processing.

SUMMARY OF THE INVENTION

One aspect of our invention resides in a method of separating two otherwise contacting glass articles to protect their opposed surfaces during heat treatment, the method comprising applying a coating of an inert, refractory material in the form of submicron size particles to at least one of the opposed glass surfaces.

Another aspect is a method of heat treating a plurality of glass sheets which comprises applying a coating of an inert, refractory material, in the form of submicron size particles, to at least one surface of each glass sheet, stacking the coated sheets so that at least one of each pair of adjacent surfaces has a coating, and subjecting the stack to a predetermined temperature for a predetermined time.

One method of applying the coating involves dispersing submicron particles of the coating material, preferably below 0.1 micron average diameter, in a liquid, and spraying the dispersion on the glass surface. Alternatively, the glass may be dipped into the dispersion, or the dispersion may be applied by spinning. Electrostatic powder coating techniques may also be employed. Suitable inert, refractory powders include silica, titania, alumina and zirconia. The primary requirement is that individual particles are of submicron size and are non-reactive with the glass at the treatment temperatures. Chloro- and chlorofluoro- hydrocarbons are preferred vehicles.

PRIOR ART

The following United States patents are cited of possible interest:

U.S. Pat. No. 4,360,544 (Franz et al.) describes a method for protecting glass surfaces in a stack of glass sheets by treating the surfaces with an organotin compound before separating adjacent surfaces with an interleaving material. The latter may be wood flour, or synthetic polymer particles. The organotin compound serves as a stain inhibitor and imparts lubricity.

U.S. Pat. No. 4,487,807 (Duffer et al.) describes a method similar to that of Franz et al., except that the stain inhibitor is an organic acid that crystallizes on the glass.

U.S. Pat. No. 4,606,946 (Duffer et al.) describes applying a powdered interleaving material, such as acrylic resin beads, to a glass surface by dispersing the powder in atomized water, applying the dispersion to the glass and drying to an adherent layer.

The foregoing patents are primarily concerned with neutralizing alkalies on a glass surface to inhibit staining. The interleaving materials disclosed are the conventional organics commonly used under ambient conditions.

U.S. Pat. No. 4,159,206 (Armbruster et al.) describes an abrasion resistant coating comprising colloidal silica and an alkoxysilane mixture. This coating is intended to remain on the glass, and is not disclosed as having any utility in a glass stack.

DESCRIPTION OF THE INVENTION

Figure 1:
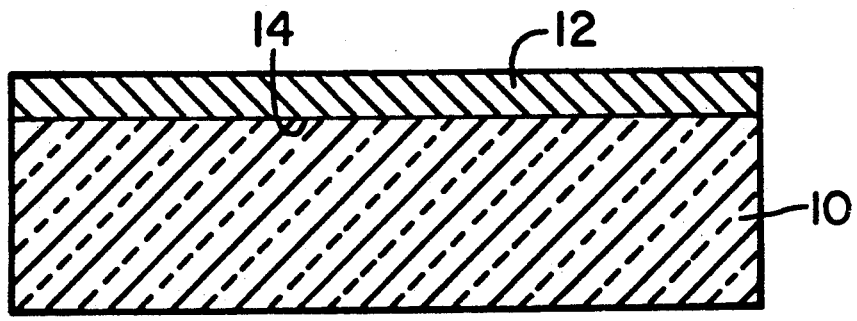
FIG. 1 is a side elevational view of a glass sheet coated in accordance with the invention.

Our invention is basically concerned with use of a parting agent to separate adjacent glass articles during thermal processing. It is based on our discovery that particle size is of critical importance in maintaining an optical-quality surface during such thermal processing.

More particularly, we have found that a glass surface will remain unmarred if an inert, refractory coating of submicron size particles is employed. The submicron particles are so small and tightly packed there is little or no chance for the glass to sag, or develop an indented, or dimpled, surface. Even if some movement between the glass articles occurs, the particles tend to be spherical and act as ball bearings. This allows movement without frictional resistance which would lead to marring the glass surface.

Submicron size particles can be dispersed in a medium and deposited by spraying, or dipping, or spinning. This leaves a tightly packed barrier layer of particles on the glass surface. An automated, retractable holder facilitates the dipping process. It also permits controlling and varying the withdrawal rate as desired. Electrostatic powder techniques may be used if it is desired to avoid a dispersion.

The basic requirement is that the glass surface be covered with at least a monolayer of submicron particles. Accordingly, when a dispersion is employed, we find it desirable that the dispersion contain at least 0.1% by volume of the submicron particles, and, preferably, about 0.5% as a precautionary measure. The upper limit is governed by ability to apply the dispersion. This depends on both the particles and vehicle.

The refractory material chosen must be inert, that is non-reactive at the glass processing temperatures, with respect to the glass surface to which it is applied. In general, refractory oxides, such as silica, titania, alumina and zirconia, are commercially available as particles of submicron size, and hence are preferred. For example, submicron size silica is available from DeGussa under the designation OX-50, or from Cabot under the designation CAB-O-SIL EH-5. It may also be prepared by chemical vapor deposition techniques.

When a dispersion is used, three basic criteria guide selection of a suitable vehicle or solvent system to provide a smooth coating. The powder should readily disperse in the vehicle; the resulting dispersion should wet the glass surface; and the coating should dry quickly and cleanly.

In developing our invention, we have found chloroform most effective as a vehicle. A chlorofluorohydrocarbon, available under the mark FREON, is less toxic, and also effective. The growing aversion to chlorofluorohydrocarbons may necessitate employing one of the various alternatives to these compounds now being proposed. Various other organic systems are also possible. A water system, with added surfactant, may be used, but tends to dry slowly.

It is customary to include a dispersing agent, or surfactant, with a vehicle to facilitate dispersion of the powder and wetting of the surface being coated. An alcohol, such as decanol, may be employed as a hydrogen bonding surfactant with the chloro-type vehicles. This makes the glass surface more organophilic, and hence wettable by the non-aqueous system. Decanol could not be used with an aqueous system, but various surfactants and wetting agents are available, such as amines and other chelating agents.

While not so limited, our invention finds particular application in the thermal processing of thin glass sheets. In this application, a glass sheet is heated to a temperature below the glass softening point to secure a high degree of compaction in the glass. While a single sheet may be processed between supporting plates, it is customary to employ a stacked arrangement with as many as 25 thin glass sheets in a stack.

Under such thermal treatment, the glass tends to soften to such an extent that it must be firmly supported to avoid slumping and distortion. Also, each sheet must be isolated from adjacent sheets to avoid the sheets sticking together.

The known organic interleaving materials are quickly destroyed under oxidizing conditions at the elevated temperatures involved. Inorganic materials greater than about one micron in particle size tend to indent, and thus roughen, the softened glass surface. We have found that this problem is largely avoided by using coating materials of submicron particle size.

FIG. 1 of the attached drawing is a side elevational view of an individual glass sheet 10 having a coating of submicron size particles 12 applied over its upper surface 14. It will be understood that sheet 10 could as well be coated on both surfaces. Such double side coating is inherent in a dipping procedure.

Figure 2:
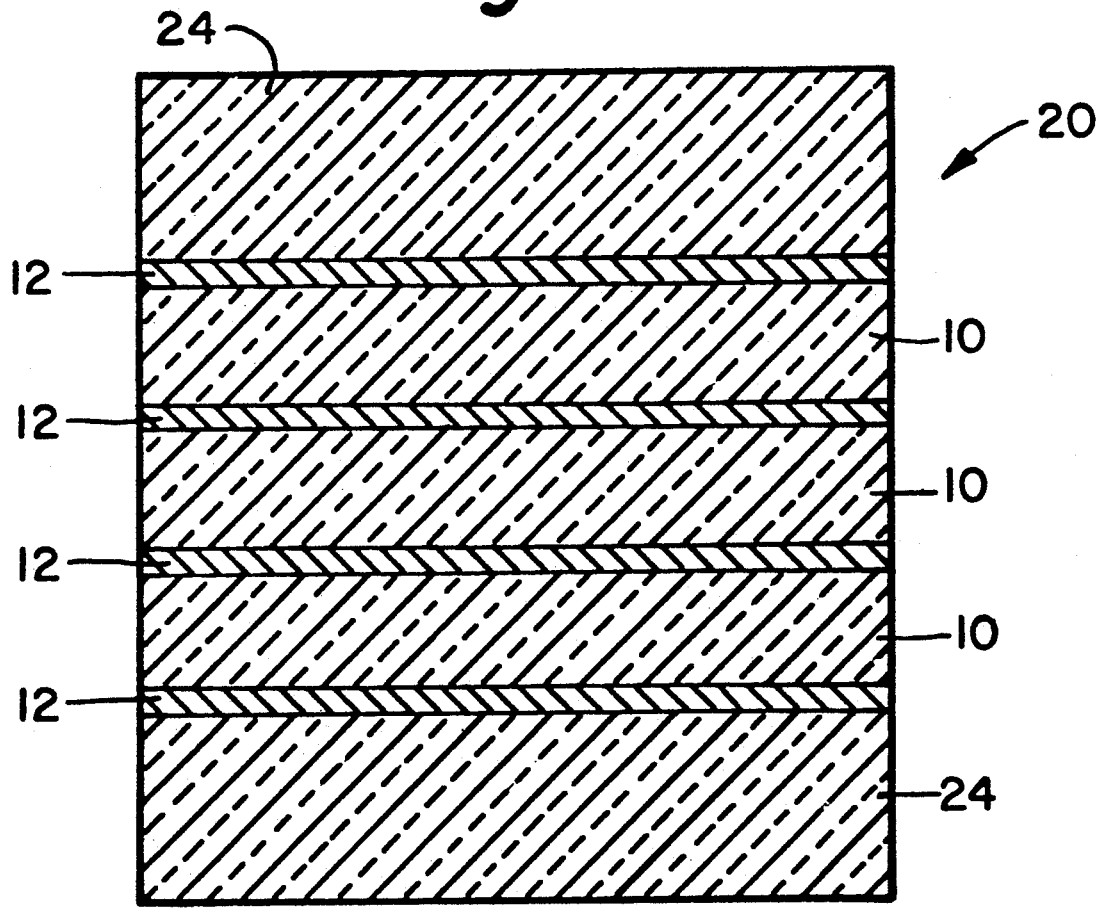
FIG. 2 is a side elevational view of a plurality of coated glass sheets stacked for heat treatment in accordance with the invention.

FIG. 2 is a side elevational view of a stack 20 which is composed of three glass sheets 10 stacked between two high-temperature cover sheets 24. Two of glass sheets 10 may be coated on one side, as in FIG. 1, or on both sides, as in the case of sheets dipped in a dispersion. The third sheet, either bottom or top, must be double side coated to avoid sticking to the cover sheet. Alternatively, it would be necessary to coat the cover sheet. If single side coated sheets are used, care must be taken in stacking to insure a layer of coating intermediate each pair of adjacent glass surfaces.

SPECIFIC EXAMPLES

The invention is further described with reference to specific embodiments. In examples 1-5 and 8-10, thin sheets of a $BaO-Al_2O_3-B_2O_3-SiO_2$ glass, available from Corning Incorporated under the code number 7059, were heat treated in stacks at about 630° C. for about one hour. The individual sheets were coated on both sides by dipping in a dispersion and withdrawing. The coated glass sheet was dried in air.

EXAMPLE 1

Approximately 33 grams of OX-50 silica powder were combined with 6 cc of decanol and 54 cc of chloroform. This corresponds to 20% by volume silica, 8% by volume decanol and 72% by volume chloroform. The mixture was ball milled overnight in a TEFLON bottle with fused silica balls. It was then further diluted with chloroform to provide a coating solution with about 5% by volume silica.

Three 4"×4" thin glass plates were serially dipped in the mixture, rapidly removed, and dried after removing the bead that formed on the bottom edge of each vertically held sheet. The thus coated sheets were then stacked between two quarter inch thick, polished, fused silica plates as top and bottom plates in the manner shown in FIG. 2.

The stack was fired in air in a muffle furnace at about 630° C. for one hour. After cooling and disassembly, the silica powder was easily washed off the glass surfaces. No sticking occurred, and no loss of surface quality was visually apparent.

EXAMPLE 2

The procedure of Example 1 was repeated, except that trichlorotrifluoroethane was substituted for chloroform in the mixture in the same proportions by volume. The same coating techniques produced a very uniform silica layer. No deleterious effect on the sheet glass surfaces was observable after heating for an hour at 630° C.

EXAMPLE 3

In this Example, CAB-0-SIL EH-5 silica powder was used. This silica has a very small particle size (about 70 Angstom Units) and, hence, a greater surface area. Accordingly, a mixture of 55 grams silica powder, 47.5 cc decanol and 427.5 cc chloroform was prepared. This is equivalent to 5% silica, 9.5% decanol and 85.5% chloroform, all by volume.

The resulting transparent sol was still too concentrated to provide the desired coating thickness. Therefore, it was diluted to 2% by volume silica by adding 750 cc chloroform. This mixture was applied by dipping and dried. The coated sheets were fired in a stack at 630° C. as before. When cooled and disassembled, the silica was easily removed, and no discernible change in surface quality was noted.

EXAMPLE 4

Example 3 was repeated using trichlorotrifluoroethane as the solvent. The dispersion produced a uniform coating. Following the heat treatment, the silica was easily removed, and no impairment of the glass surface finish could be observed.

EXAMPLE 5

A series of glass sheets, each prepared in different manner, was stacked for heat treatment. The stack had top and bottom base plates, as in Example 1. A silica coated sheet, prepared in accordance with Example 1, was placed on the base plate. Then an uncoated sheet was added, followed by another sheet coated on both sides, in accordance with Example 3. This was followed by a sheet coated as in Example 4, and finally, the top plate.

After firing and disassembly, each sheet was easily cleaned, and showed no sign of indents, or other surface marring. Measured compaction values on the glass sheets were in close agreement with predicted values taken from a viscosity compaction curve.

It will be appreciated that other refractory materials of submicron particle size might be readily substituted. In addition to particle size, the important condition is that the coating material be inert, that is, non-reactive at the glass processing temperatures, to the glass on which it is used.

EXAMPLES 6 AND 7

Example 4 was repeated using a more dilute silica dispersion (0.5 volume percent) on glass sheets having different compositions and properties. Both glasses were taken from the alkaline earth boroaluminosilicate composition family. Each had somewhat higher viscosity-temperature characteristics than that used in Examples 1-5. Accordingly, higher heat treatment temperatures of 660° C. and 680° C. were employed. Again, when the sheets were cooled, disassembled and cleaned, no effect on surface quality was apparent.

EXAMPLE 8

A mixture of 40 cc decanol, 150 cc trichlorotrifluoroethane, and 22 grams of EH-5 silica powder was placed in a 2000 cc plastic bottle and agitated for five minutes on a paint shaker. The mixture was then further diluted with 1800 cc trichlorotrifluoroethane. Alumina balls were added and the 0.5% $SiO_2$ dispersion milled on a roller mill for 60 hours.

Several 6×6 inch glass sheets were coated by dipping in a tank containing the dispersion. A withdrawal rate of about 12 inches per minute was used to avoid streaks in the coating. The sheets were dried, stacked and heat treated for one hour at 630° C. The stack was cooled, disassembled and cleaned. Surface quality was not visually impaired.

EXAMPLE 9

A set of 40 1×2 inch glass samples was treated with the dispersion of Example 8. Eight stacks were assembled between 6×6 inch, 96% silica support plates and fired at 600° C. for one hour. A variety of cleaning treatments were tested on the samples after cooling. Optical and electron microscopic examination showed that, with proper cleaning, the glass surface quality was at least as good as that of untreated glass.

EXAMPLE 10

A larger scale trial was made in which 6×6 inch plates of code 7059 glass were provided with silica coatings employing a 0.5 volume percent silica coating mixture as described in Example 8. Twelve stacks of 15 plates each were assembled between temperature resistant support plates. The stacks were heat treated at 620° C. for one hour in a lehr. When cooled and cleaned, the sheets showed no apparent loss of surface quality.

We claim:

1. A method of separating two otherwise contacting glass articles to protect their opposed surfaces during heat treatment, the method comprising coating at least one of the opposed glass surfaces with at least a monolayer of inert, refractory particles that are submicron in size and that remain non-adherent during thermal treatment, whereby the coating may be easily removed.

2. A method in accordance with claim 1 wherein the protective coating is applied to both glass surfaces.

3. A method in accordance with claim 1 wherein the refractory material is an oxide.

4. A method in accordance with claim 3 wherein the oxide is silica.

5. A method in accordance with claim 1 wherein the coating contains spherical particles.

6. A method in accordance with claim 1 wherein the coating is composed of particles less than 0.1 micron in size.

7. A method in accordance with claim 1 wherein the refractory material is applied as a dispersion containing at least about 0.1% by volume of the material.

8. A method of heat treating a plurality of glass sheets having opposed surfaces which comprises coating at least one surface of each glass sheet with at least a monolayer of inert, refractory particles that are submicron in size and that remain non-adherent during thermal treatment whereby the coating may be easily removed, stacking the coated sheets so that at least one of each pair of adjacent surfaces has a coating, subjecting the stack to a predetermined temperature for a predetermined time, cooling and removing the coating without loss of surface quality on the glass surface.

9. A method in accordance with claim 8 wherein the coating is applied as a powder by electrostatic coating of the powder on the glass surface.

10. A method in accordance with claim 8 wherein the coating is applied from a dispersion of the inert, refractory material in a vehicle.

11. A method in accordance with claim 10 wherein the dispersion contains at least about 0.1% by volume of the refractory material.

12. A method in accordance with claim 10 wherein the dispersion is sprayed on the glass surface.

13. A method in accordance with claim 10 wherein a glass sheet is inserted into the dispersion, whereby both sides of the sheet are coated.

14. A method in accordance with claim 13 wherein the glass sheet is removed from the dispersion and air dried.

15. A method in accordance with claim 10 wherein the vehicle is a non-aqueous vehicle is selected from a group composed of chloroform and chlorofluorocarbons.

16. A method in accordance with claim 15 wherein the medium further contains an alcohol.

17. A method in accordance with claim 16 wherein the alcohol is decanol.

18. A method in accordance with claim 8 wherein the inert, refractory material contains spherical particles.

19. A method in accordance with claim 8 wherein the inert, refractory material is in the form of particles less than 0.1 micron in size.

20. A method in accordance with claim 8 wherein the stack is heated to below the glass softening point to compact the glass sheets.

* * * * *